United States Patent [19]  
Hatanaka

[11] 4,111,587  
[45] Sep. 5, 1978

[54] TOOL HOLDER

[75] Inventor: Takefumi Hatanaka, Matsudo, Japan

[73] Assignee: International Patent Transactions Company Limited, Tokyo, Japan

[21] Appl. No.: 819,418

[22] Filed: Jul. 27, 1977

[30] Foreign Application Priority Data

Jun. 10, 1977 [JP] Japan ................................. 52-67861

[51] Int. Cl.² ............................................. B26D 1/00
[52] U.S. Cl. ........................................ 407/91; 407/95; 407/109; 279/1 SG
[58] Field of Search ............. 407/91, 94, 95, 108–110, 407/83, 84, 89, 81, 73; 408/197, 198; 279/1 SG, 96, 121, 122; 29/96

[56] References Cited  
U.S. PATENT DOCUMENTS

| 64,494 | 5/1867 | Cooper | 407/94 |
| 78,520 | 6/1868 | Fowler | 407/91 |
| 687,237 | 11/1901 | Jackson | 407/91 |
| 1,453,133 | 4/1923 | Heinze | 407/91 |
| 2,337,663 | 12/1943 | Jones | 407/91 |

Primary Examiner—Leonidas Vlachos  
Attorney, Agent, or Firm—Armstrong, Nikaido, Marmelstein & Kubovcik

[57] ABSTRACT

A tool holder including a holder body having a retaining bore for slidably accommodating a bar-type tip. A tapered bore is provided in concentric relationship with the retaining bore, and wedge means is inserted within the tapered bore. The wedge means is movable in the axial direction thereof; whereby the wedge means is adapted to be brought into clamping engagement with the outer periphery of the bar-type tip.

5 Claims, 3 Drawing Figures

TOOL HOLDER

This invention relates to a cutting tool, and more particularly to a tool holder of the type that is adapted to adjustably secure a bar-type tip fabricated from a material such as a super-hard alloy.

Various prior art cutting tools of this general type have heretofore been used and have been adapted to replaceably secure to the end of a shank a triangular or rectangular throw-away type tip made of a super-hard steel alloy. Cutting tools of this type are uneconomical owing to the fact that the tip must be discarded and replaced by a new one as soon as the cutting edge of the tip sustains a small amount of wear. Throw-away tips are particularly uneconomical since their market price has become quite high in view of the recent world-wide shortage of raw materials for super-hard alloys. Moreover, the cost of producing a holder for such cutting tools is high since the holder possesses a complicated construction which includes a tip guide for constantly positioning the tip at the end of the holer, a clamping member for securing the tip, a recess for preventing movement of the clamping member, and a clamp bore for securing the clamping member. Furthermore, as the structure in which the tip is pressed from above by the clamping member does not exert enough forces to retain the tip, the latter will not only move and thus prevent a hazardous situation but will also be incapable of providing an accurate cut in cases where the tip is subjected to severe shocks such as may be sustained during heavy-duty or intermittent cutting.

Other prior art tool holders are of a type in which the end of a clamping bolt is brought into tight engagement with the outer periphery of the bar-type tip after the tip has been inserted into the holder, or of a type in which a tapered rod is forced into direct contact with the side of the tip following its insertion into the handle. However, the intensive force necessary to secure the tip in both of these holders subjects the tip to damage. The force for retaining the bar-type tip is insufficient since the tip is supported at one point only.

In an effort to overcome these defects, a method has been proposed in which the bar-like tip is reinforced by fitting in into a steel retaining sleeve and brazing it in place, and then securing the retaining sleeve in the holder by driving a tapered rod between the outer periphery of the retaining sleeve and the holder, the rod being fabricated from a metal which is hareder than the sleeve. However, since the tapered rod subjects the retaining sleeve to elastic deformation within the retaining bore of the holder, there is an increase in the frictional force between the retaining bore and retaining sleeve so that fine adjustment of the tip is difficult.

Accordingly, the object of the present invention is the provision of a tool holder which enables a bar-type alloy tip to be used by feeding it out of the holder.

Another object of the invention is the provision of a tool holder which, by increasing the force which retains the bar-type tip in proportion to the cutting pressure, enables both light and heavy-duty cutting to be performed with a high degree of accuracy.

A further object of the invention is the provision of a tool holder which allows the position of the bar-type tip to be finely adjusted in a comparatively easy manner.

Still another object of the invention is the provision of a tool holder which allows the bar-type tip to be attached and detached in an extremely easy manner.

Still another object of the invention is the provision of a tool holder which is simple in construction, easily workable, and suited to mass-production.

A more detailed description of a preferred embodiment of the invention will now be had with reference to the accompanying drawings, in which.

Figure 1:
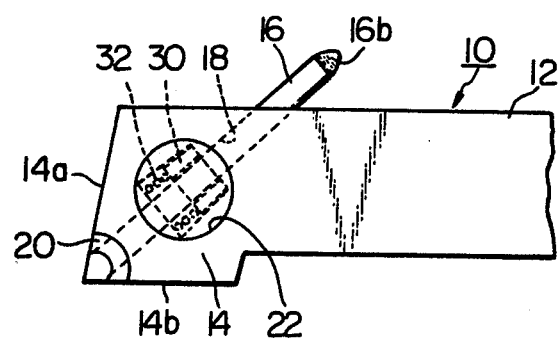
FIG. 1 is a plan view illustrating a preferred embodiment of a tool holder in accordance with the invention.

Referring to FIG. 1, reference numeral 10 denotes a tool holder in conformance with the invention. The holder is comprised of an elongated shank or body 12 having a rectangular cross-section and fabricated from tool steel. The front end of the holder body 12 includes a tip receiving portion 14 which has side flank faces 14a, 14b that meet at their front edges. The lower side of the tip receiving portion 14 is formed to include a clearance surface 14c the purpose of which will be explained later.

Figure 2:
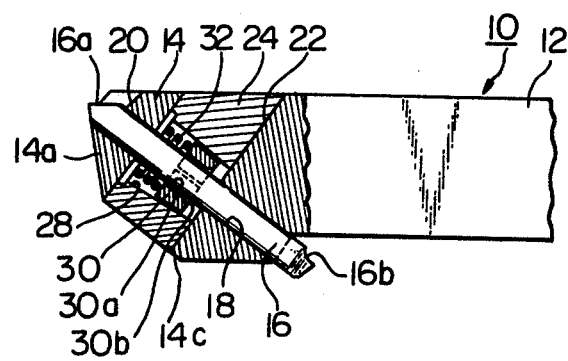
FIG. 2 is a partial cross-sectional view of the tool holder of FIG. 1.
Figure 3:
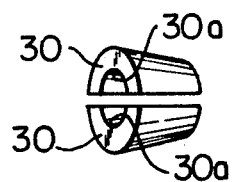
FIG. 3 shows a preferred embodiment of a wedge used in the tool holder.

It may be appreciated from FIGS. 1 and 2 that tip receiving portion 14 is provided with a retaining bore 18, extending from the front end to the rear portion thereof, to slidably accommodate therein a round bar-type tip 16 made of a super-hard alloy. The center axis of the retaining bore intersects the center axis of the holder body 12, and the bore is drilled through the tip receiving portion 14 at an inclined angle and extends from the upper to the lower surface thereof. Cutting edges 16a, 16b of different type are formed at the ends of the tip, with cutting edge 16a set in the working position as shown in the drawings. The front end of the tip receiving portion in the vicinity of cutting edge 16a is formed to include a guide surface 20 for scraps. Tip receiving portion 14 also includes a clamping bore 22 intersecting the tip retaining bore 18 at right angles and accommodating a clamping shaft 24 inserted therein. The clearance surface 14c is provided to facilitate the machining of clamping bore 22. Clamping shaft 24 is formed to include a tapered bore 28 in concentric relationship with the tip retaining bore 18 and oriented such that its wider end faces the direction of cutting. Inserted within the tapered bore 28 and movable in the axial direction thereof is a wedge 30 which is biased by a spring 32 in a direction as will tighten the wedge about the tip. The wedge, as can be seen in FIG. 3, is comprised of divided tapered sleeves 30 which possess a clamping surface 30a identical in configuration to the outer surface of the tip. The clamping surfaces 30a also include a plurality of longitudinally extending grooves. In order to facilitate the insertion of the tip 16 into the sleeve 30 the constricted side of the same is formed to include a tapered surface 30b, as shown in FIG. 2

According to the above-described construction, inserting tip 16 from the rear side of retaining bore 18 moves sleeve 30 against the force of spring 32 so that the tip can pass through the bore. When cutting edge 16a has reached a prescribed position and an external force acting in the same direction as the biasing force of spring 32 is then applied to the cutting edge, tapered sleeve 30 works to clamp the tip 16 in the prescribed position. The greater the cutting pressure applied to the cutting tip 16a during cutting, the greater the clamping force of the tapered sleeve. This reliably prevents accidental displacement of the tip during the cutting operation. Thus, a principal feature of the present invention resides in the fact that the construction of the tool holder is adapted to increase the clamping force in proportion to the cutting pressure. Accordingly, whereas the conventional throw-away type cutting tool is primarily used for a light cutting operation, the cutting tool of the present invention may be applied not only to light cutting but to heavy cutting and precision cutting as well. The present invention is constructed so as to clamp all bar-type tips having a variety of cutting edges; hence, a large number of cutting operations are possible merely by changing the tip. Furthermore, the clamping action of tapered sleeve 30 is released whenever tip 16 is applied with a force acting in a direction opposite to that of the biasing force of spring 32. Accordingly, the tip can easily be removed from the holder without using a hexagon wrench or the like, merely by lightly tapping the tip with a tool such as a wooden mallet, thereby enhancing working efficiency. The tip can also be used economically since it is capable of being fed out from the holder.

Although the present invention has been described with respect to a preferred embodiment, it is to be understood that many changes and modifications are possible. For example, the tapered bore 28 may be formed directly within the tip receiving portion 14, and the wedge 30 may be replaced by a plurality of steel balls retained in a cage. Further, bar-type tip 16 and clamping shaft 24, although both shown to be circular in cross-section, may be modified so as to possess a rectangular cross-section. Moreover, although an elongated shank is described as the body of the tool holder in accordance with the present embodiment, it is obvious that the invention can also be applied to a holder body which is circular in shape.

What is claimed is:
1. A tool holder comprising:
a holder body having a retaining bore for slidably accommodating a bar-type tip;
a tapered bore in concentric relationship with said retaining bore; and wedge means inserted within said tapered bore and movable in the axial direction thereof; whereby said wedge means is adapted to be brought into clamping engagement with the outer periphery of said bar-type tip.
2. The tool holder according to claim 1, wherein the holder body is formed with a clamping bore which intersects the retaining bore, and a clamping shaft is inserted within said clamping bore, said tapered bore being formed in said clamping shaft.
3. The tool holder according to claim 1, wherein the tapered bore is provided with biasing means adapted to normally bias said wedge means in the clamping direction.
4. The tool holder according to claim 1, wherein said wedge means comprises an axially divided tapered sleeve having a circular cross-section.
5. The tool holder according to claim 1, wherein both ends of the bar-type tip are formed to include cutting edges.

* * * * *